April 13, 1937.   N. L. WISSI   2,077,084
CAR LOADING DEVICE
Filed March 13, 1933   2 Sheets-Sheet 1
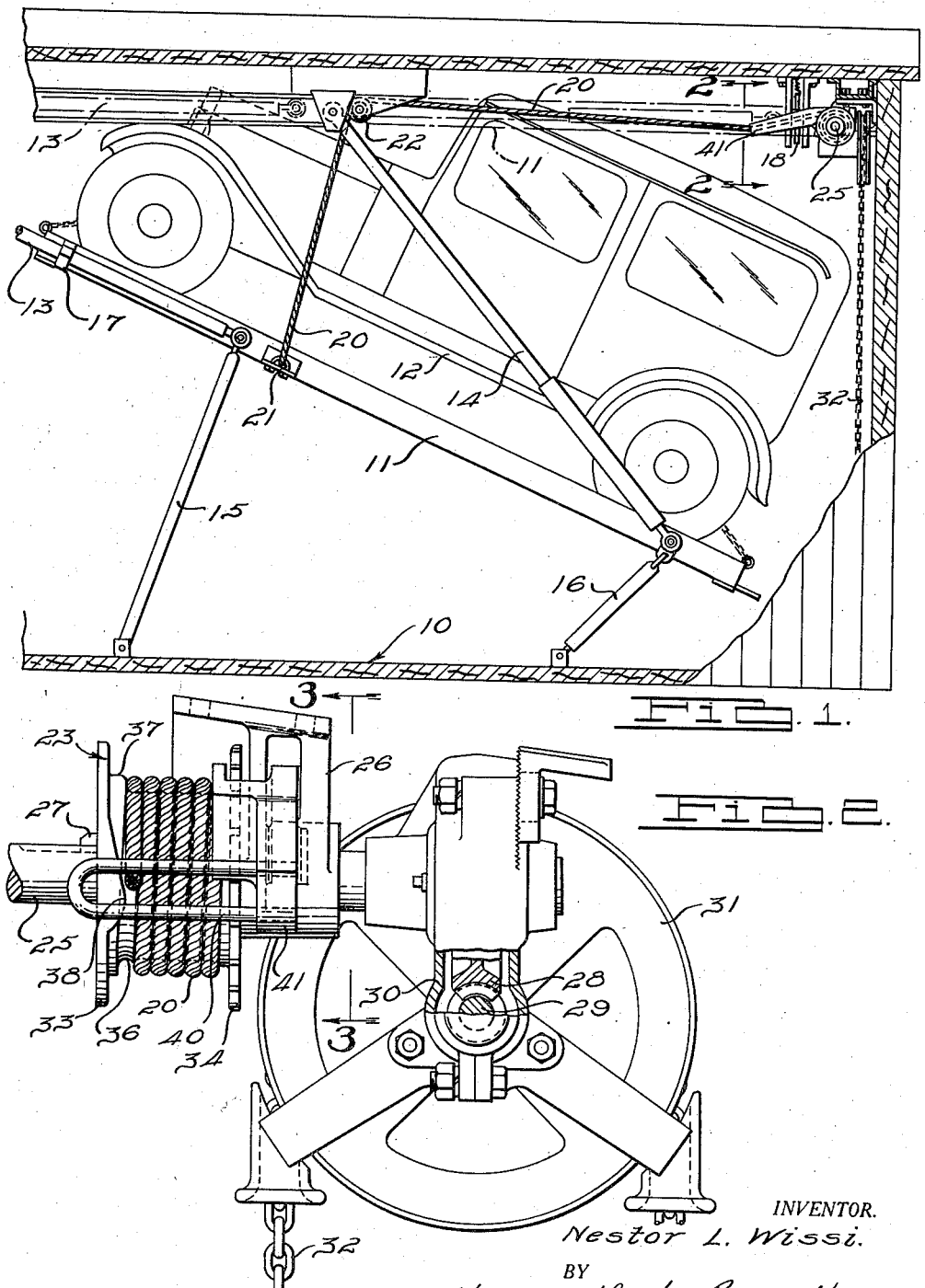
INVENTOR.
Nestor L. Wissi.
BY
ATTORNEYS.

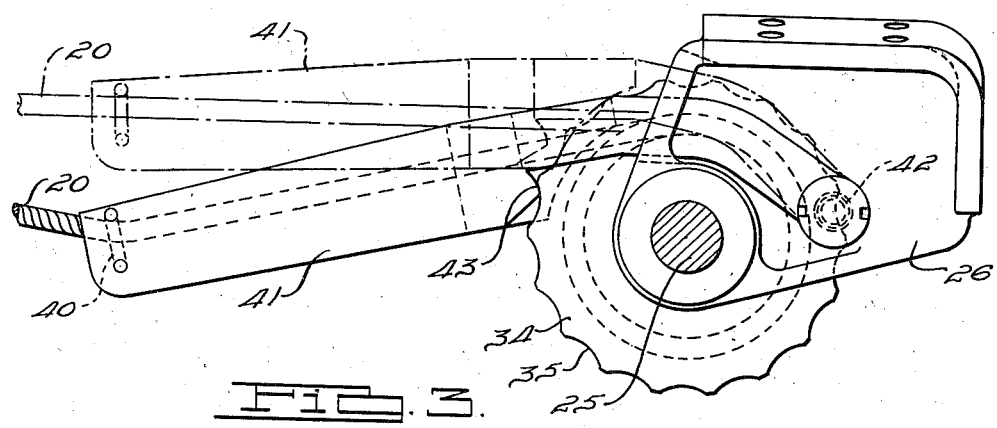
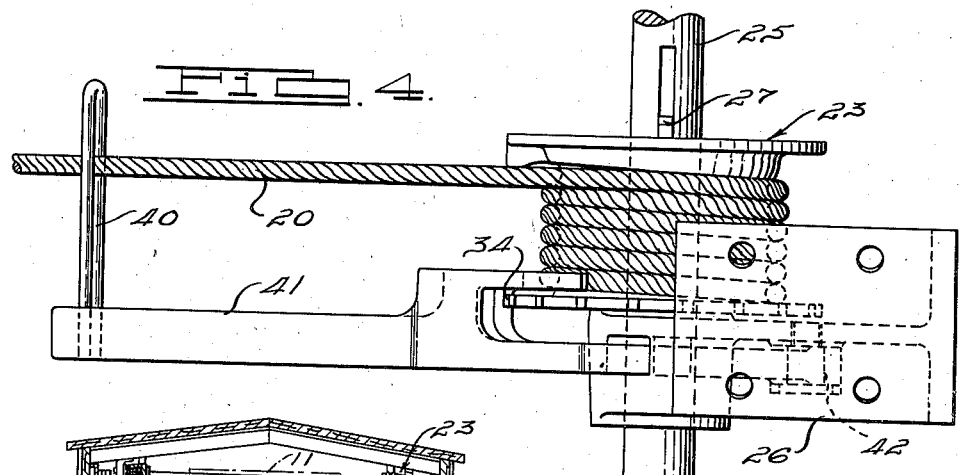
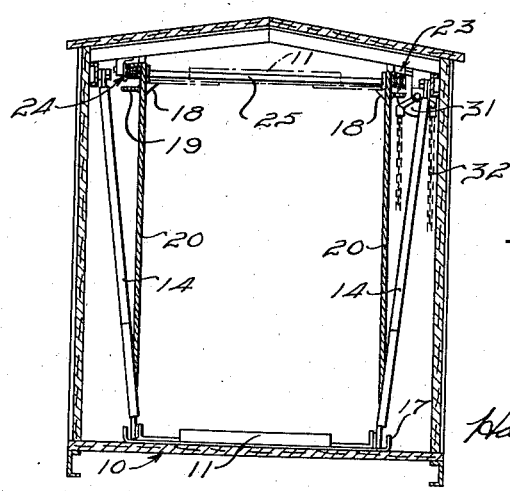
INVENTOR.
Nestor L. Wissi.
BY
Harness, Dickey, Pierce & Hann.
ATTORNEYS.

Patented Apr. 13, 1937

2,077,084

UNITED STATES PATENT OFFICE 2,077,084

CAR LOADING DEVICE

Nestor L. Wissi, Detroit, Mich., assignor to The Worth Company, a corporation of Michigan Application March 13, 1933, Serial No. 660,500

17 Claims. (Cl. 105—368)

The invention relates to loading devices and it has particular relation to a device for raising and lowering automobiles in freight cars.

An automobile loading device for freight cars has been provided comprising a frame pivotally connected to upper parts of the car by a plurality of swingable rods. This frame initially is adapted to rest on the floor of the car and when in such position, to have an automobile secured thereon, and then to be swung longitudinally into a semi-decking or inclined position. When the loading device is not to be used, the frame may be swung into a substantially horizontal position adjacent the roof of the car thereby leaving the latter in a condition where it may be used for transporting ordinary freight. For raising the frame to its semi-decking position and also to its position adjacent the roof, a device is provided including drums and cables extending from an upper part of the car to the frame and after the frame is in its loading or in its uppermost position means are provided to hold it in such position and permit slacking of the cables to avoid tension thereon.

While apparatus of this character has functioned in a fairly satisfactory manner, it has been found that occasionally too much slack was provided in the cables and that the slack portions swung during swaying and movement of the car and engaged finished parts of the automobile resulting in damage thereto. Also, the cables at times became wound on the drums in an uneven and undesirable lapping manner and this not only caused excessive wear thereof, but also caused one cable to lift more rapidly than the other, thereby subjecting one cable to a greater load or else causing sidewise tilting of the frame.

It has also been found that on certain occasions men working around freight cars or who happen to be in them manipulate the device to slacken the cables while the frame is in its uppermost position, and then without thinking, release the holding means and this causes the frame to swing downwardly at a very rapid rate which is dangerous to anyone in the vicinity of the moving frame. Frames of this character are heavy and the danger in the unloosening of a frame which may freely move downwardly from the top of a freight car, is manifest.

One object of the present invention is to provide a mechanism for lifting and lowering objects, including means for automatically and positively preventing any substantial slack in the cables or other flexible means that may be used, after the object is in a raised and supported position.

Another object of the invention is to provide a mechanism of the above character, in which the cables or other flexible elements employed can only be substantially loosened to permit downward movement thereof when the cables or elements are under tension and hence when a load is supported thereby.

Another object of the invention is to provide an automobile loading mechanism for freight cars having control means of this character, wherein the control is located adjacent the roof of the freight car where it cannot be tampered with by any ordinary manual maneuver.

Another object of the invention is to provide a lifting and lowering mechanism including a drum having a cable wound around it, wherein the arrangement and construction are of such character that the cable is always wound in the proper manner and wear thereon is reduced to a minimum.

And, in general, it is an object of the invention to provide an improved loading mechanism and particularly an improved loading mechanism for use in conjunction with car loading devices to the end that greater efficiency may be obtained and danger to anyone in the vicinity of the loading mechanism may be eliminated.

Other objects of the invention will become apparent from the following description relating to the drawings, and from the claims hereinafter set forth.

For a better understanding of the invention, reference may be had to the drawings forming a part of the specification, wherein:

Fig. 1 is a fragmentary and side elevational view of a freight car illustrating a car loading and hoisting mechanism, constructed according to one form of the invention.

Fig. 2 is a cross-sectional view on a larger scale taken substantially along the line 2—2 of Fig. 1.

Fig. 3 is a cross-sectional view taken substantially along the line 3—3 of Fig. 2.

Fig. 4 is a plan view of the construction shown by Fig. 3.

Fig. 5 is an end view of the loading mechanism in the freight car.

Referring to Figs. 1 and 5, a freight car is indicated at 10 and a rectangular automobile decking frame at 11. This frame is adapted to support an automobile 12 and when the latter is on the frame, suitable fastening means such as chain devices are employed for securing the axles of the automobile to opposite end portions of the frame. At its front end, the frame is pivotally connected to upper parts of the car by a pair of rods 13 respectively disposed at opposite sides of the frame, while at its rear end the frame is pivotally connected to the upper parts of the car by a pair of rods 14 also disposed at opposite sides of the automobile. Initially the frame is adapted to rest on the floor of the car and when in such position, the rods 14 are substantially perpendicular while the rods 13 are inclined forwardly and upwardly. In raising the frame, owing to the position and length of the rods, the frame is moved into an inclined or semi-decking position as shown and when in such position, rods 15 may be used to support the front end of the frame on the floor and rods 16 used to support the rear end of the frame on the floor. When the freight car is not to be used for automobile transporting purposes, the rods 15 and 16 may be disposed in alignment with the frame and releasably fastened thereto and then the frame and rods 13 and 14 may be moved into a horizontal position adjacent the roof as shown in broken lines. In accomplishing this result, hooks 17 are provided at opposite sides and at the forward end of the frame and these hooks are adapted to receive the rods 13 when they and the frame become aligned in the semi-decking position of the frame. Then upon a further movement of the rods 13 and frame upwardly, these parts will pivot together as a unit about the upper pivotal connections between rods 13 and the car. Also to allow this pivotal movement of the frame 11 and rods 13 as an entity or unit, the rods 14 are of telescopic character so as to permit in effect, a shortening thereof and finally a positioning of the rods 14, frame 11 and rods 13 in a substantially horizontal plane adjacent the roof of the car. When the parts are so positioned, latching means 18 mounted on the roof of the car and adapted to cooperate with each side of the frame, are employed to hold the parts in this position and it will be understood that wires or other suitable members as indicated at 19, may be operatively connected to the latching means and extend to a lower part of the car adjacent the end wall to permit releasing thereof. Preferably these latching means have hook portions that receive rib portions of the frame in such manner that the latches can only be released by first raising the frame slightly to allow disengagement of the latches.

For raising and lowering the frame, cables 20 connected to opposite sides of the frame as indicated at 21 and at points slightly to the rear of the pivotal connections between rods 13 and the frame, are provided and these cables extend upwardly and over pulleys 22 journaled in brackets secured to the roof of the car at opposite sides thereof. The cables then extend rearwardly toward the end wall and along the roof, and as shown by Figs. 2 and 5, are trained about drums 23 and 24 mounted on opposite ends of a shaft 25 which is journaled in brackets 26 secured to the roof adjacent the upper edge of the end wall of the car. These drums as indicated at 27 in Fig. 2 are keyed to the shaft so as to rotate therewith. One end of the shaft 25 has a worm wheel 28 rigidly mounted thereon and such wheel meshes with a worm 29 journaled in a housing 30 that is also used for housing the worm wheel. The worm 29 has a sprocket wheel 31 mounted thereon and such sprocket wheel has an endless chain 32 trained about it which extends downwardly adjacent the end wall to a lower point in the car for manual manipulation of the chain. It will be understood that the worm and worm wheel connection normally serves as a lock to prevent turning of the shaft 25 except when the chain is manipulated.

The drum 23 comprises end flanges 33 and 34 and, as best shown by Fig. 3, the flange 34 has circumferentially separated, concave teeth 35 on its outer periphery. Between the flanges 33 and 34, the drum is of smaller diameter and is spirally grooved as indicated at 36 for receiving convolutions of the cable. In winding the cable by rotating the drum, the cable follows in the spiral groove until it reaches the end of the latter, and then begins to wind between a circumferentially extending shoulder 37 and the end convolution of cable adjacent thereto, until a cam element 38 on the inner face of flange 33, causes the cable to begin to wind in a reverse spiral over the first layer of convolutions. This arrangement enables uniform spiral winding of the cable in an inner convolution, and then reverse winding in a spiral manner over the first layer of cable.

The drum 24 is identical to drum 23 except that flange 34 has no teeth 35 therein, and both drums are so mounted on shaft 25 that the cams 36 are in the same circumferential position. Accordingly, initial winding of the outer and reverse spirals of both cables will occur simultaneously.

For insuring proper winding and unwinding of both cables and drums and preventing any substantial slack in the cables, a U-shape guide 40 is provided which extends lengthwise of drum 23, and this guide is mounted on an arm 41 which, as best shown by Fig. 3, extends above the shaft and is pivotally mounted on a pin 42 mounted on the bracket 26 at the opposite side of shaft 25. This arm 41 also has a tooth or cam portion 43 adapted to move downwardly by gravity, into one of the concave teeth on flange 34.

To illustrate the function of the guide 40 and arm 41 with its tooth 43, it is perhaps best to describe the operation of the loading device in connection therewith. When the frame of the automobile is raised to a semi-decking position and the supporting rods 15 and 16 are in place, then of course it is desirable to slacken the cables slightly to place the load on the rods 15 and 16. Before placing these rods 15 and 16 and while the cables support the load, the arm 41 and both cables are disposed as shown in Fig. 3 in broken lines. When the load is taken by the rods 15 and 16 and the chain is manipulated to slacken the cables, the arm 41 moves downwardly by gravity and this results in the tooth 43 falling into a tooth 35 on the drum flange 34 and when this happens, further unwinding movement of the drums is positively prevented even by manipulation of the chain. Thus the amount of slack that can occur is slight and is positively limited. This prevents excessive slack particularly between the pulleys 22 and the drums which is advantageous because if there were very much slack, the cables hanging between the pulleys and drums might sway from side to side during movement of the freight car and possibly strike the automobile and mar finished surfaces thereof. Furthermore, by limiting the amount of slack and maintaining only a slight amount, proper arrangement and winding of the cables on the drums is insured and this in turn, during raising of the frame to its semi-decking position or to its position adjacent the roof, insures an equal raising of the frame on each side by the cables since they wind about the drums in the same manner and with the same linear speed. If, for example, the cable on one drum became overlapped or out of position, aside from the wear and tear that might occur, the cable might be wound at a different linear rate than the cable on the opposite drum and as a result the frame would be tilted sidewise or one cable would take most of the load.

Additionally, when the frame is in a raised and supported position such as when the rods 15 and 16 are holding it in its semi-decking position or when the latching means is holding it adjacent the roof, limiting of the slack prevents anybody from unwinding the drums by moving the chain and producing a considerable amount of slack in the cables. If this slack were allowed to occur particularly when the frame is in its position adjacent the roof, and the latching means broke or in any manner became released, there would not be anything to prevent a rapid falling of the frame downwardly. The arrangement provided, however, prevents this creating of slack so that if the latching means did become released, the cables immediately would be able to take the load and the frame could not fall except through the distance necessary to bring the cables to a taut condition. It will be understood, of course, that with the arm 41 in the lower position shown by Fig. 3 in full lines, further winding of the cable by manipulation of the chain is permitted for as soon as this winding begins, the arm and cables are moved upwardly to the broken line position and then winding of the drum may be continued. In general, the provision of the arm 41 prevents an unwinding of the drums except when the cables are under tension and hence when they are supporting a load, except of course to the limited amount necessary to create the amount of slack shown by Fig. 3.

The arrangement is also very advantageous when the frame is lowered to and is on the floor, because as soon as the frame reaches the floor, further manipulation of the chain, without the arrangement provided, would cause a further unwinding of the drums and might even cause a winding of the cables in the wrong direction. With the arrangement provided, as soon as the frame reaches the floor and a slight slack occurs in the cables, further unwinding is prevented. Additionally, the operator could not manipulate the chain except in one direction, which would be the proper direction for winding of the cables.

The invention increases the efficiency of operation of the loading device, insures equal linear movement of the cables and uniform raising and lowering of the frame at all times, insures proper winding and unwinding of the cables, increases the durability of the cables by preventing wear, and avoids damage to decked automobiles by swaying of slack cables. Furthermore, the invention provides a safety feature in that the cables are at all times in a position to immediately take the load of the frame in the event the latter begins to fall as it is impossible to unwind the cables except a slight amount, unless they are actually carrying the load.

While only one form of the invention has been illustrated and described in detail, it will be apparent to those skilled in the art that various modifications may be made without departing from the scope of the appended claims.

I claim:

1. A loading device comprising rotary means, a flexible member wound around the rotary means and extending therefrom for supporting an object, and means for automatically preventing turning of the rotary means to unwind the flexible member, except when the latter is under tension.

2. A loading device comprising rotary means, a flexible member wound around the rotary means and extending therefrom for supporting an object, and means governed by the slack in the flexible member for automatically preventing turning of the rotary means to unwind the cable.

3. A loading device comprising rotary means, a flexible member wound around the rotary means and extending therefrom for raising or lowering an object, and means for preventing unwinding movement of the rotary means except when the flexible member is under tension but freely permitting a reverse movement of the rotary means.

4. In combination, a freight car or the like, rotary means mounted in the car, a flexible member wound around the rotary means and extending therefrom for supporting an object, and means for preventing unwinding of the flexible member except when it is under tension as when the object is supported thereby.

5. In combination, a freight car or the like, rotary means mounted in the car, a flexible member wound around the rotary means and extending therefrom for supporting an object, and means for preventing unwinding of the flexible member except when it is under tension as when the object is supported thereby, but freely permitting winding of the member.

6. In combination, a hoisting device including a flexible member for raising and lowering an object, means for actuating the device, means for releasably holding the object in a raised position, and means for automatically limiting the amount of slack that may occur in said member after it is so held in raised position, to an extent that would prevent any substantial lowering of the object in the event of release of the holding means.

7. In combination, rotary means, means for turning the rotary means, a flexible member wound around the rotary means and extending therefrom for raising and lowering an object, means normally preventing turning of the rotary means by tensioning of the flexible member, means for releasably holding the object in a raised position, and means for automatically limiting an unwinding movement of the rotary means when the object is supported by such holding means.

8. The combination with a freight car, of rotary means mounted in the car, a flexible member wound around the rotary means and extending therefrom for raising or lowering an object, means for turning the rotary means, means normally preventing turning of such rotary means by tensioning of the flexible member, means for releasably holding the object in a raised position, and means for automatically preventing any substantial unwinding movement of the rotary means by action of such turning means, when the object is supported by such holding means.

9. The combination with a freight car or the like, of a frame, means pivotally supporting the frame for raising and lowering movement in an arcuate path, rotary means mounted in the car, a flexible member wound around the rotary means and extending therefrom and connected to the frame for raising and lowering the latter, means for turning the rotary means, means normally preventing unwinding movement of the rotary means by tensioning of the member, means for releasably holding the frame in a raised position, and means for automatically preventing unwinding movement of the rotary means by action of the turning means, when the frame is supported by such holding means.

10. The combination with a freight car or the like, of a frame, means pivotally supporting the frame for raising and lowering movement in an arcuate path, rotary means mounted in the car, a flexible member wound around the rotary means and extending therefrom and connected to the frame for raising and lowering the latter, means for turning the rotary means, means normally preventing unwinding movement of the rotary means by tensioning of the member, means for releasably holding the frame in a raised position, and means for automatically preventing unwinding movement of the rotary means by action of the turning means, when the frame is supported by such holding means, but allowing such unwinding movement by action of the turning means, when the flexible member is under tension.

11. In combination, rotary means, a flexible member wound around the rotary means and extending therefrom for raising or lowering an object, means for turning the rotary means, means normally preventing unwinding of the rotary means by tension on the flexible member, annular means on the rotary means and having teeth thereon, and a pivoted member engaging the flexible member and having means adapted to engage the teeth when slack occurs in the flexible member, and prevent turning of the rotary means by the turning means.

12. In combination with a freight car, means in the freight car for supporting an object, hoisting means including a flexible suspension member for raising the first means, auxiliary means for supporting the first means in elevated position, and means for automatically preventing unwinding of the flexible member when the auxiliary means is supporting said first means.

13. A loading device, comprising means for raising and lowering a load, and means for automatically preventing a lowering operation of the first means except when the latter supports the load.

14. In combination with a freight car, means in the freight car for supporting an object, hoisting means including a flexible suspension member for raising the first means, latching means on said freight car for supporting the first means in elevated position, and means for automatically preventing unwinding of the flexible member when the latching means is supporting the first means.

15. In combination with a freight car or the like, of a frame, means pivotally supporting the frame for raising and lowering movement in an arcuate path, rotary means mounted in the car, a flexible member wound around the rotary means and extending therefrom and connected to the frame for raising and lowering the latter, means for turning the rotary means, means normally preventing the unwinding movement of the rotary means by tension of the member, latching means on the freight car for releasably holding the frame in a raised position, and means for automatically preventing unwinding movement of the rotary means by action of the turning means when the object is supported by such latching means.

16. In combination with a freight car or the like, of a frame adapted to raise and support an automobile in elevated position, means for supporting the frame in its raised position, rotary hoist means adjacent the roof of the car for raising the frame, flexible means operatively connected to the rotary means and extending therefrom along the roof and then downwardly where it is connected to the frame, means for turning the rotary means to wind up the flexible means so as to raise the frame or to unwind the flexible means so as to lower the frame, movable and releasable locking means for preventing rotation of the rotary means in a direction to unwind the flexible means, and means on said locking means and engageable and movable upwardly and downwardly by that part of the flexible means extending along the roof for releasing the locking means when the flexible means is supporting the load of the frame and therefore is under tension and for actuating the locking means to prevent unwinding of the rotary means when the flexible means is not supporting the frame and after a small amount of slack occurs in the aforementioned part of the flexible means, whereby when the frame is in raised position and the load is taken off the flexible means unwinding movement of the rotary means is prevented except to the extent of obtaining such small amount of slack.

17. In combination with a freight car or the like, of a frame adapted to raise and support an automobile in elevated position, means for supporting the frame in its raised position, rotary hoist means adjacent the roof of the car for raising the frame, flexible means operatively connected to the rotary means and extending therefrom along the roof and then downwardly where it is connected to the frame, means for turning the rotary means to wind up the flexible means so as to raise the frame or to unwind the flexible means so as to lower the frame, movable and releasable locking means for preventing rotation of the rotary means in a direction to unwind the flexible means, and means on said locking means and engageable and movable upwardly and downwardly by that part of the flexible means extending along the roof for releasing the locking means when the flexible means is supporting the load of the frame and therefore is under tension and for actuating the locking means to prevent unwinding of the rotary means when the flexible means is not supporting the frame and after a small amount of slack occurs in the aforementioned part of the flexible means, whereby when the frame is in raised position and the load is taken off the flexible means unwinding movement of the rotary means is prevented except to the extent of obtaining such small amount of slack, said locking means and the means thereon engageable with the cable comprising a toothed flange on the rotary means and a pivoted pawl engageable with the flange and having an apertured portion through which the aforementioned part of the flexible means passes.

NESTOR L. WISSI.